United States Patent
Gracia Inglés et al.

(10) Patent No.: US 11,695,295 B2
(45) Date of Patent: Jul. 4, 2023

(54) PV-OPTIMISER POWER SYSTEM FOR SUPPLY OF POWER FROM A PHOTOVOLTAIC INSTALLATION

(71) Applicant: SOLTEC INNOVATIONS, SL, Molina de Segura (ES)

(72) Inventors: José Angel Gracia Inglés, Los Alcázares (ES); José Antonio Villarejo Mañas, Cartagena (ES); María Esther De Jodar Bonilla, Cartagena (ES)

(73) Assignee: SOLTEC INNOVATIONS, SL, Molina de Segura (ES)

( * ) Notice: Subject to any disclaimer, the term of this patent is extended or adjusted under 35 U.S.C. 154(b) by 0 days.

(21) Appl. No.: 17/641,714

(22) PCT Filed: Sep. 9, 2020

(86) PCT No.: PCT/ES2020/070538
§ 371 (c)(1),
(2) Date: Mar. 9, 2022

(87) PCT Pub. No.: WO2021/048458
PCT Pub. Date: Mar. 18, 2021

(65) Prior Publication Data
US 2022/0399743 A1    Dec. 15, 2022

(30) Foreign Application Priority Data
Sep. 10, 2019    (EP) ..................... 19382787

(51) Int. Cl.
*H02J 7/35*    (2006.01)
*H02J 7/00*    (2006.01)
(Continued)

(52) U.S. Cl.
CPC .............. *H02J 7/35* (2013.01); *H02J 7/0013* (2013.01); *H02J 11/00* (2013.01);
(Continued)

(58) Field of Classification Search
CPC .. H02J 7/35; H02J 7/0013; H02J 11/00; H02J 2207/20; H02J 2300/26; H02J 7/00; H02S 10/20; H02S 20/32; H02S 40/32
See application file for complete search history.

(56) References Cited

U.S. PATENT DOCUMENTS

| | | |
|---|---|---|
| 2016/0248259 A1 | 8/2016 | Berger et al. |
| 2018/0331543 A1 | 11/2018 | Palombini et al. |
| 2019/0222167 A1 | 7/2019 | Fernandez Luque et al. |

FOREIGN PATENT DOCUMENTS

EP    3514911 A1    7/2019

OTHER PUBLICATIONS

International Search Report for patent application PCT/ES2020/070538 issued by the European Patent Office and dated Jan. 19, 2021, translation provided.
(Continued)

*Primary Examiner* — Robert L Deberadinis
(74) *Attorney, Agent, or Firm* — Hassan Abbas Shakir; Shakir Law PLLC

(57) ABSTRACT

A PV-optimiser power system for a photovoltaic installation for supply of power from a photovoltaic installation. The system includes a first DC/DC converter connected to a PV panel and to one or more energy storage modules, and a second DC/DC converter, connected in parallel to the PV panel in a string of PV panels of a PV installation, wherein the second DC/DC converter is configured to operate as an optimiser and execute a maximum power point tracking algorithm (MPPT) to determine the maximum power output of the PV panel of the plurality of the PV panels in the string.

7 Claims, 3 Drawing Sheets

(51) Int. Cl.
*H02J 11/00* (2006.01)
*H02S 10/20* (2014.01)
*H02S 20/32* (2014.01)
*H02S 40/32* (2014.01)

(52) U.S. Cl.
CPC ....... *H02J 2207/20* (2020.01); *H02J 2300/26* (2020.01); *H02S 10/20* (2014.12); *H02S 20/32* (2014.12); *H02S 40/32* (2014.12)

(56) References Cited

OTHER PUBLICATIONS

Written Opinion of the International Searching Authority for patent application PCT/ES2020/070538 issued by the European Patent Office and uploaded to WIPO Patentscope dated Mar. 18, 2021, in English.
European Search Report for patent application EP 19382787.0 issued by the European Patent Office and dated Nov. 11, 2019, in English.

PV-OPTIMISER POWER SYSTEM FOR SUPPLY OF POWER FROM A PHOTOVOLTAIC INSTALLATION

TECHNICAL FIELD

The present invention discloses a PV-optimiser power system for supply of power from a photovoltaic installation. In particular, the invention relates to an auxiliary power system to supply electrical power to solar trackers, electronic control, security systems, monitoring systems and others electronic equipment close to the devices that require electrical power.

Photovoltaic (PV) installations usually include secondary or complementary systems or devices which requires an electrical power source in order to function. Several solutions commonly used in the current state of the art include:
1. Low voltage electric installations powered by an electrical grid, which requires the use of a second electric installation increasing costs
2. Low voltage electric installations powered by PV installation, which also requires the use of a second electric installation increasing costs
3. High voltage power supply from strings of the PV installation, which requires the use of a high voltage electric installation and a high voltage DC/DC converter increasing costs and complexity.

The term "photovoltaic installation", or PV installation should be understood herein as an alternative to solar photovoltaic plant, photovoltaic power station, solar park, solar farm, photovoltaic installation or photovoltaic system, all of which are known used terms in this specific field.

Furthermore, the abbreviation/acronym "PV" may be used throughout this document instead of the term "photovoltaic".

In this description a PV-optimiser power system will be understood as a DC to DC converter technology implemented to maximize the energy harvested from a solar photovoltaic panel.

STATE OF THE ART

WO2017174829 discloses an installation comprising: an arrangement for generating a direct current, formed by electrical generators (PV1 ... PVn) which are connected in series and located inside of a local zone and which supply to a remote zone a total direct current that is the sum of the current generated by each of the electrical generators (PV1 ... PVn); an auxiliary power supply device (D) disposed inside of the local zone and which provides local supply voltage to an auxiliary device (E), the auxiliary power supply device (D) being composed of a DC power converter (CP) electrically connected in series by respective input terminals (T1, T2) in the arrangement for generating direct current between two connection points (p1, p2) of the electrical generators located inside of the local zone US2028/0115165A1 discloses a rechargeable battery controller combined with a rechargeable battery and used in an existing PV system. The controller includes a DC-DC converter. which allows power to be passed between a power line and a rechargeable battery, and a control unit, which determines whether maximum power point tracking (MPPT) control using hill climbing is being performed by a PCS based on an input voltage or current value of the PCS. The control unit regulates charge/discharge power of the rechargeable battery to allow input power of the PCS to be a target value based on the input voltage and current values of the PCS while MPPT control using hill climbing is performed, and maintains, in a period during which MPPT control using hill climbing is not performed, the charge/discharge power to be the power at a beginning of the period.

However solutions in which a DC/DC converter to feed a charge or consumer is connected in series to one or more PV panels of a PV string of the PV installation, have proven to be inefficient because they can cause a voltage drop at string terminals if any one of the PV panels in said string having connected a DC/DC converter is malfunctioning through the use of bypass diodes, reducing the power outcome of the PV installation and causing a voltage drop at string terminals.

BRIEF DESCRIPTION OF THE INVENTION

The invention proposed herein is applicable to a PV installation having a several strings of PV panels and with at least one DC/DC converter connected to one PV panel of said plurality of PV panels of said string, to feed one or more energy storage modules or consumers as in the previous cited patent documents. This first DC/DC converter is configured to redirect a portion of power generated by said PV panel to the cited one or more energy storage modules.

The strings of PV panels of the PV installation are connected to a central inverter of the PV installation.

The invention proposes the use of a second DC/DC converter, connected in parallel to said PV panel of said string (including cited first DC/DC converter) in a way that avoids the entry of the by-pass diode of the PV panel into conduction and at the same time allows the maximum possible energy to be extracted from the panel to which the consumer has been connected. According to this solution said second DC/DC converter is configured to operate as an optimiser and execute a MPPT algorithm to determine maximum power output of the PV panel, so that indirectly assisting the central inverter to obtain a maximum power of said at least one string. The output current of the second DC/DC converter is determined by the string.

Moreover, for a good operation of the PV-optimiser power system the second DC/DC converter is configured to operate at a voltage over than the first DC/DC converter minimum starting load voltage VSL needed for said first DC/DC converter to be started.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and not imitative, in which.

DETAILED DESCRIPTION OF AN EMBODIMENT

Figure 1:
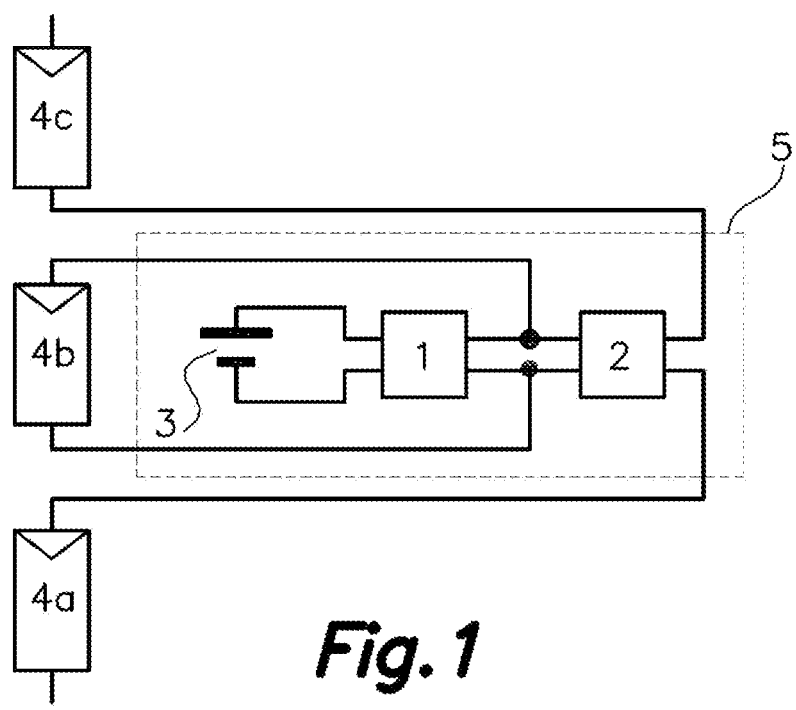
FIG. 1 is a block diagram of the PV-optimiser power system for supply of power from a PV installation, showing the second converter aimed to implement a MPPT algorithm, connected in parallel with the first converter, said second converter also called optimiser in that it avoids the conduction of the bypass diodes at the same time that allow to obtain a maximum energy from the PV panel. It should be emphasized that PV panel 4b, does not form part of the power system but of a string where the power system is installed. This has been indicated by illustrating the PV panel 4b outside a rectangle representing the PV-optimiser power system.

The foregoing and other advantages and features will be more fully understood from the following detailed description of an embodiment with reference to the accompanying drawings, to be taken in an illustrative and non-(imitative manner, in which:

FIG. 1 represents a block diagram of the PV-optimiser power system 5 of this invention. This PV-optimiser power system 5 is connected in series with the existing string.

It shows a first DC/DC converter 1 connected in parallel to one PV panel 4b of the string. This first DC/DC converter 1 is configured to redirect a portion of power generated by the PV panel 4b to one or more energy storage modules 3 (for example a battery). The portion of energy redirected by the DC/DC converter 1 is lower than the total energy generated by the PV panel 4b.

FIG. 1 also includes according to the principles of this invention a second DC/DC converter 2, connected in parallel to the PV panel 4b and this second DC/DC converter is configured to operate as an optimiser and to execute a MPPT algorithm to determine the maximum power output of the PV panel (4b), so that indirectly assisting the central inverter (6) to obtain a maximum power of said at least one string (including this second DC/DC converter 2). Therefore, the output current of the second DC/DC converter 2 is determined by the string and the MPPT algorithm of the second DC/DC converter 2 controls the output of the second DC/DC converter 2 voltage delivered to the string. The energy storage modules charger 1 controls the current supplied to the energy storage modules 3 that comes from the PV panel 4b according to the working point controlled by the second DC/DC converter 2. The energy storage modules 3 accumulate the current supplied by the PV panel 4b controlled by the energy storage modules charger 1.

According to the principles of this invention a voltage input of the second DC/DC converter 2 is equal to the voltage of the PV panel (4b) adjusted by the MPPT algorithm of the second DC/DC converter 2.

According to a preferred embodiment of the invention, the second DC/DC converter (2) is a converter that reduces voltage from its input to its output. Several different solutions can be implemented, among them the use of a buck converter, or two or more converters in parallel, etc.

Figure 2:
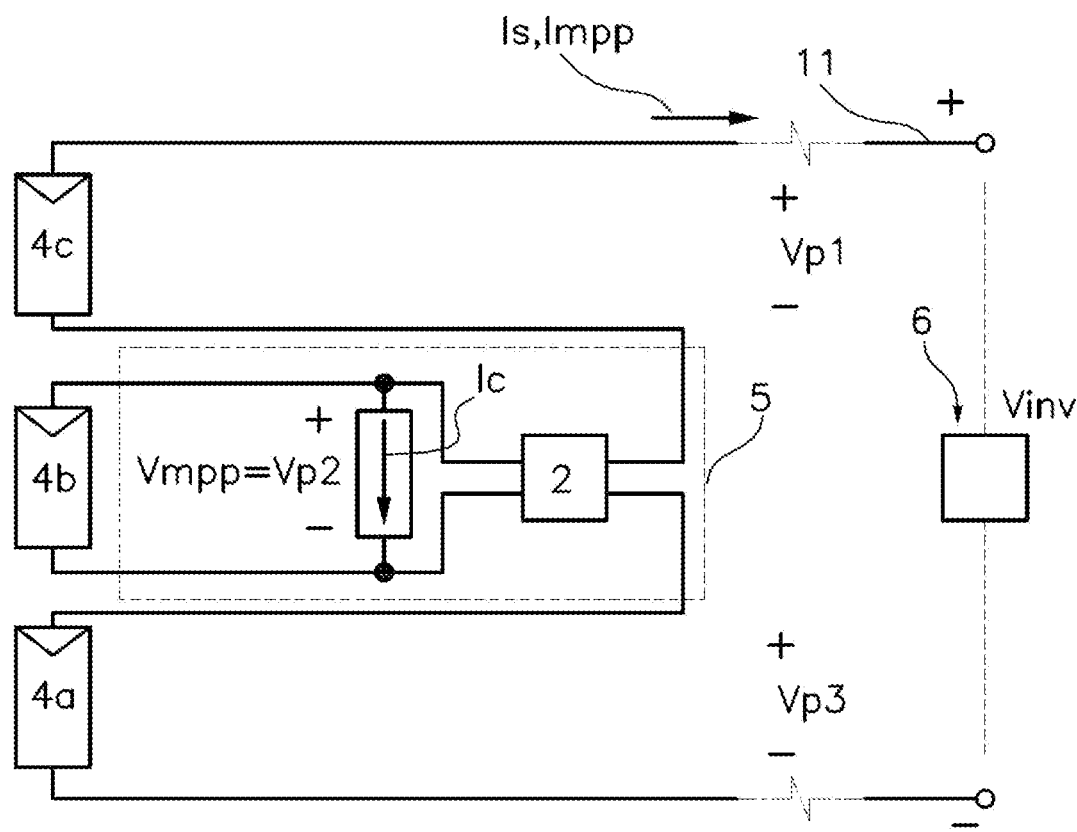
FIG. 2 is a schematic representation of the functional principle of the proposed PV-optimiser power system with indication of the central inverter.

FIG. 2 is a simplified scheme for ease of explanation representing the functional principle of the PV-optimiser power system 5 of this invention. The voltage from the strings 11 is feeding a central inverter 6 of the installation. A central inverter is a DC/AC power inverter connected to the electrical grid. This central inverter 6 regulates the voltage according to the MPPT of whole installation. This regulation done by the central inverter 6 is a slow voltage change to avoid current harmonic distortion. Therefore, the MPPT algorithm of the second DC/DC converter 2 of the PV-optimiser power system 5 has to have a faster response than the MPPT algorithm of the central inverter 6, which means that the PV-optimiser power system does not affect the performance of the string in which it is installed, and also doesn't affect the performance of the set of strings of the entire installation.

Considering in greater detail this FIG. 2, the $V_{inv}$ voltage represents the input voltage of the central inverter 6. The central inverter 6 will modify this voltage to find the maximum power point of the installation. Since the central inverter 6 is injecting energy into the grid and needs to maintain a harmonic distortion of the low current, this voltage will not change quickly. This point is important because it is assumed at all times that the search for the maximum power point of the optimizer (converter 2) is much faster than that of the central inverter 6. In today's central inverters this approach is fully valid. The string in the embodiment of this FIG. 2 consists of 3 panels for simplicity, since the number of panels does not affect the approach of the problem. The $I_c$ current represents the consumption of the load connected to the panel. This current can be calculated as the power required by the load divided by the voltage of the panel at any given moment. A current source has been assumed as the DC/DC converter must maintain the value of the voltage applied to the panel constant and properly filtered.

If the algorithm of the maximum power point tracker of the central inverter 6 operates properly, the $I_s$ current (input current to the central inverter 6) must be very close to the current of the maximum power point of the panels ($I_s = I_{mpp}$). Assuming that all panels are equal and that they are receiving the same radiation, they must all be working under these conditions with a voltage approximate to their maximum power point voltage $V_{mpp}$ (VP3=VP2=VP1=$V_{mpp}$). Assuming a 100% efficiency in the converter, the power delivered to the string is equal to $V_{mpp} * I_{mpp} - V_{mpp} * I_c$, i.e. the power provided by the panel minus the load. If the rest of the installation is also at its maximum power point, the current $I_s$ is equal to $I_{mpp}$, so the power at the converter output can be calculated as indicated in equation (1). Under these conditions it can be deduced that for the system to work correctly the output voltage must be lower than that of the maximum power point, as shown in equation (2).

$$V_o \cdot I_{mpp} = V_{mpp} \cdot I_{mpp} - V_{mpp} \cdot I_c \qquad (1)$$

$$V_o = V_{mpp} - V_{mpp} \cdot I_d / I_{mpp} \qquad (2)$$

According to these results and under the premise that galvanic isolation is not necessary in this part, the converter 2 to be used can be a reducing converter or possibly two converters connected in parallel with 180° out of phase ignition, to reduce the input capacitor and the output filter coil. The efficiency of these converters can be very high, close to 99%.

Figure 3:
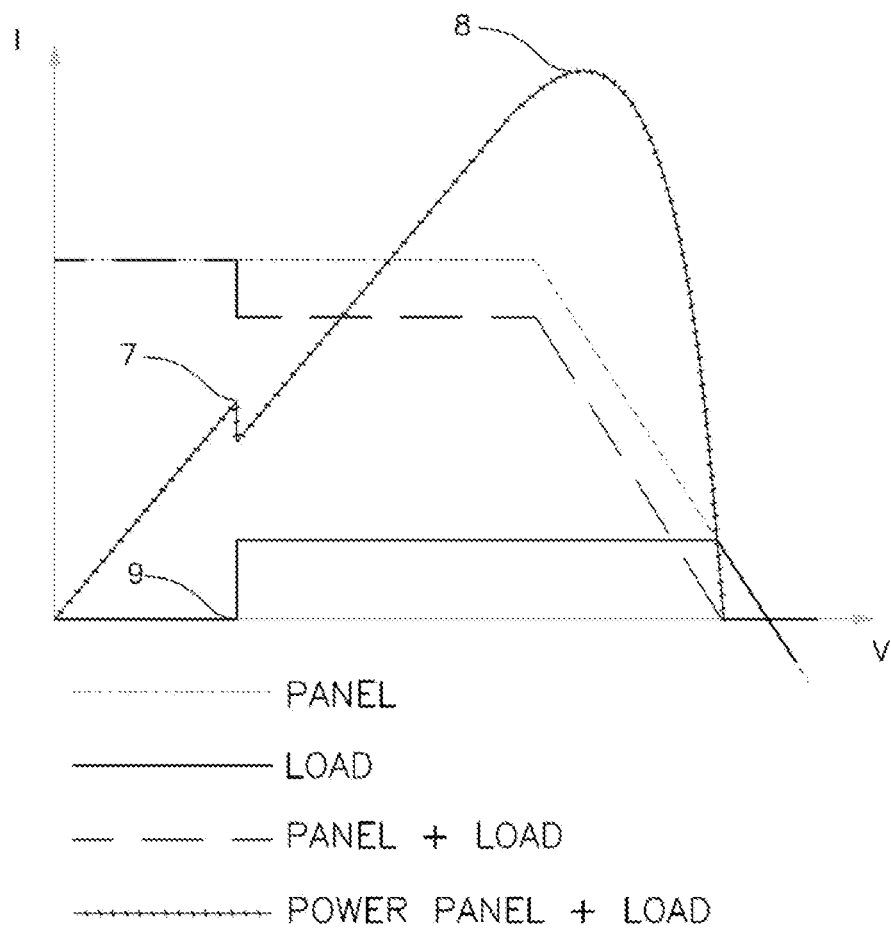
FIG. 3 is a simplified representation of the PV panel voltage-current characteristic curve, load curve, panel+ load curve and power panel+ load curve.

FIG. 3 schematically represents a PV panel voltage-current characteristic curve showing a simple load profile and a constant current source that is activated from the presence of a minimum starting load voltage VSL 9. As the load (converters 1 and 2) and the PV panel 4b are electrically connected in parallel, the current is the sum of the two currents. In this case the load would have a negative sign not included in the drawing but represented in the resulting characteristic curve, that shows a relative maximum 7 at the time the load is connected (VSL). In order for the search algorithm for the maximum power point tracking to work correctly, the absolute maximum point 8 should be taken and not the relative maximum 7 that is caused when the load is connected, and for this reason the value must be greater than the VSL value 9.

Figure 4:
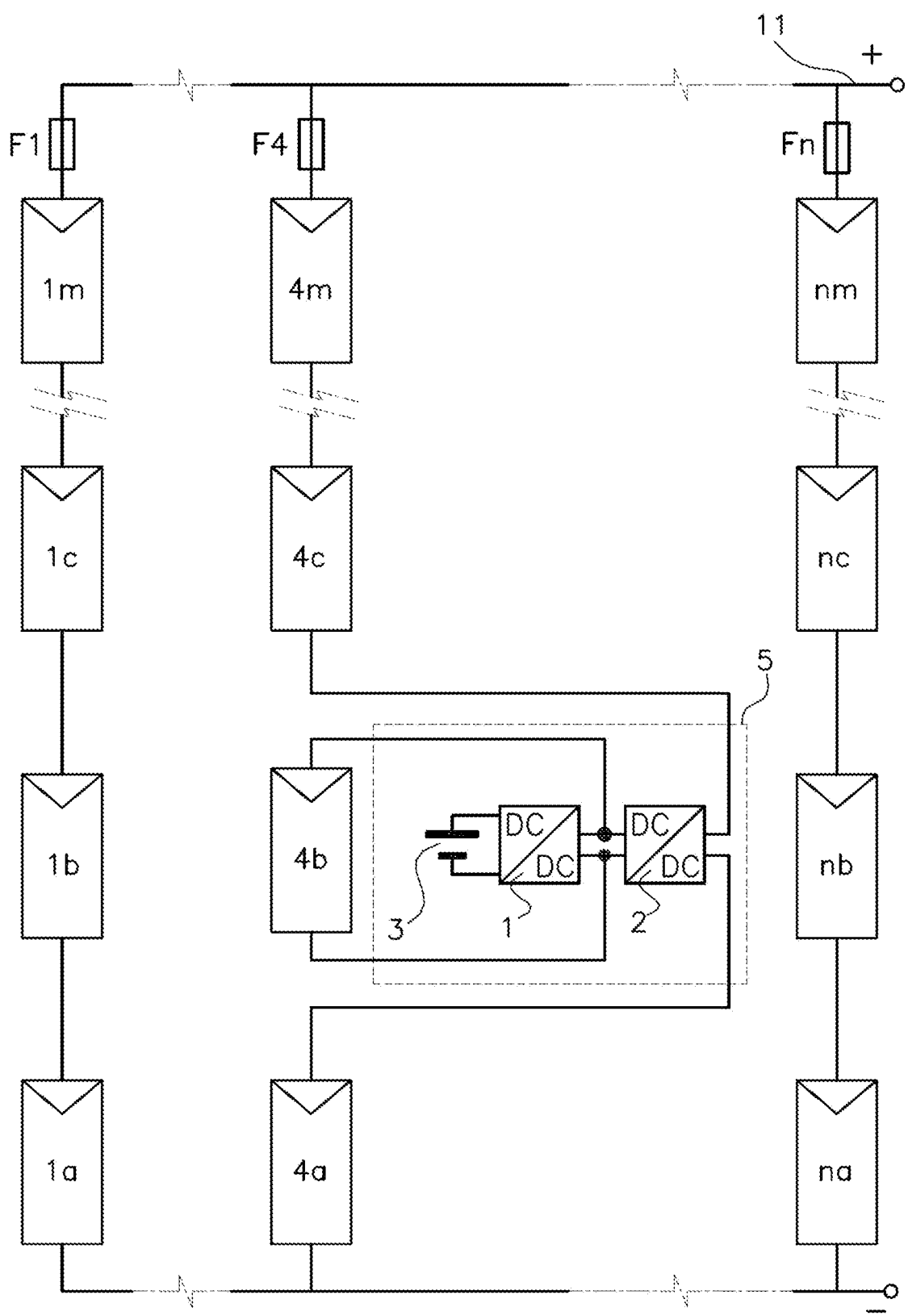
FIG. 4 is a representation of an PV-optimiser power system according to this invention within a string and with several additional strings of the whole set of strings feeding the input voltage of a central inverter.

FIG. 4 is a representation of the PV-optirniser power system installed in the string of the photovoltaic installation. The voltage from strings 11 is the voltage input of the central inverter 6 that will connect to the electrical grid. The figure shows an embodiment where the PV-optimiser power system 5 including the PV panel 4b with the converters 1 and 2 in parallel, is connected in series between PV panel 4a and 4c of a string.

The algorithm controlling the first DC/DC converter 1 further takes into account the temperature and technology of the energy storage modules 3 for optimizing the redirected power when charging the energy storage modules 3.

The electrical isolation between the input and the output of the second DC/DC converter 2 is of at least 4 KV.

According to a further embodiment of the invention the proposed PV-optimiser power system 5 is configured to automatically adjusts the load injected by first DC/DC converter 1 to the energy storage modules 3 according to the radiation impinging on the PV panels of at least one string of a solar tracker, so that the load injected to the energy storage modules 3 is increased according to the solar radiation power.

For this aim means such as sensors, control and actuators can be included to automatically adjust the DC/DC converter 1 consumption according to the radiation impinging on the PV panels of said at least one string of a solar tracker. The aim is to minimize losses in the string and apply a more intense loading of the energy storage modules 3 when there is more photovoltaic power.

The inventors have found that is important to be able to regulate the consumption of the converter 1 according to the radiation that impinges onto the solar panels or in an alternative way according to the string current.

The higher the ratio between the power of the panel and the power of the load 3 to be fed, the lower is the effect on the whole installation.

These measures allow to take advantage of the moments of greater radiation of the day to perform the feeding of the load 3 under a great power exigency.

It is also possible to avoid connecting the load early in the morning and late in the afternoon.

In case of very low radiation, the load should be adjusted to the power generated by the panel.

It will be understood that various parts of one embodiment of the invention can be freely combined with parts described in other embodiments, even being said combination not explicitly described, provided there is no harm in such combination.

What is claimed is:

1. A PV-optimiser power system for supply of power from a photovoltaic installation, in which at least a string of a solar tracker of the PV installation comprises a plurality of connected PV panels, connected to a central inverter of the PV installation, the power system comprises:
   at least a first DC/DC converter, and
   one or more energy storage modules charged by the first DC/DC converter;
   wherein the at least one first DC/DC converter is connected to one PV panel of the plurality of PV panels of the string;
   wherein the PV-optimiser power system further comprises:
      a second DC/DC converter, connected in parallel to the PV panel of the string, wherein the second DC/DC converter is configured to operate as an optimiser and to execute a maximum power point tracking, MPPT, algorithm to determine maximum power output of the PV panel, so that indirectly assisting the central inverter to obtain a maximum power of the at least one string;
   wherein the first DC/DC converter, also connected in parallel to the PV panel of the string, is configured to redirect a portion of power generated by the PV panel to the one or more energy storage modules;
   wherein the output current of the second DC/DC converter is determined by the string; and
   wherein the PV-optimiser power system is connected in parallel with the PV panel and in series with the plurality of PV panels of one of the strings of the PV installation.

2. The PV-optimiser power system according to claim 1, wherein a voltage input of the second DC/DC converter is equal to the voltage of the PV panel adjusted by the MPPT algorithm of the second DC/DC converter.

3. The PV-optimiser power system according to claim 1, wherein the MPPT algorithm of the second DC/DC converter has a faster response than the MPPT algorithm of the central inverter.

4. The PV-optimiser power system according to claim 1, wherein the second DC/DC converter is configured to operate at a voltage over than the first DC/DC converter minimum starting load voltage VSL needed for the first DC/DC converter to be started.

5. PV-optimiser power system according to claim 1, wherein the second DC/DC converter is a converter that reduces voltage from its input to its output.

6. The PV-optimiser power system according to claim 1, wherein the input and the output of the second DC/DC converter is electrically isolated.

7. The PV-optimiser power system according to claim 1, wherein the system is configured to automatically adjusts the load injected by first DC/DC converter to the energy storage modules according to the radiation impinging on the PV panels of at least one string of a solar tracker, so that the load injected to the energy storage modules is increased according to the solar radiation power.

* * * * *